May 13, 1924.
H. SCHUESSLER
WRINGER SAFETY GUARD
Filed March 3, 1922
1,493,504
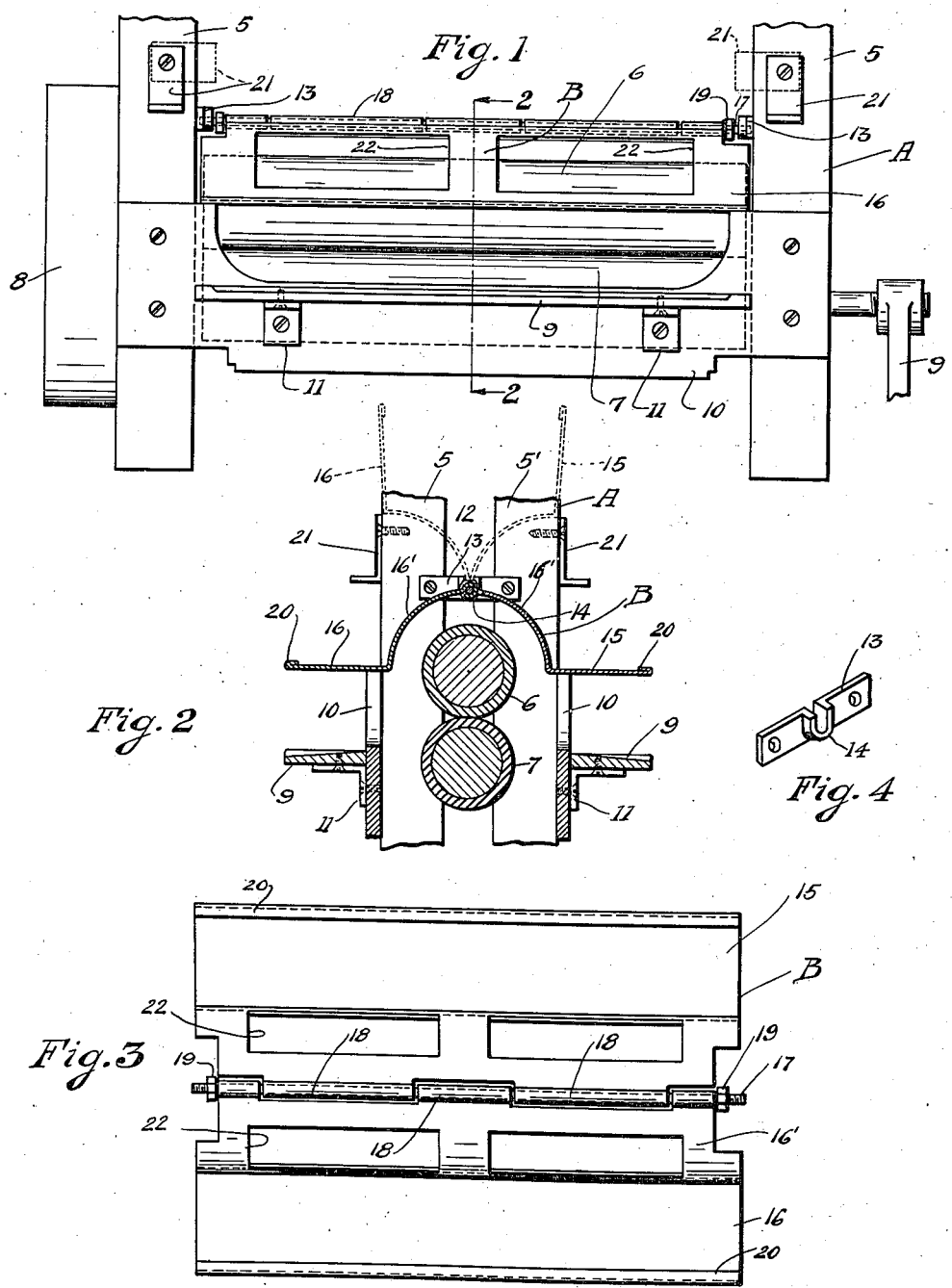
Witnesses:
Inventor
Henry Schuessler
By Joshua R. H. Poth.
His Attorney Patented May 13, 1924.

1,493,504

UNITED STATES PATENT OFFICE.

HENRY SCHUESSLER, OF CHICAGO, ILLINOIS.

WRINGER SAFETY GUARD.

Application filed March 3, 1922. Serial No. 540,772.

*To all whom it may concern:*

Be it known that I, HENRY SCHUESSLER, a citizen of the United States, and a resident of the city of Chicago, county of Cook, and State of Illinois, have invented certain new and useful Improvements in Wringer Safety Guards, of which the following is a specification.

My invention relates to Wringer Safety Guards, and has for its principal object the provision of an improved construction of this character which will be economical in manufacture and efficient in use.

The invention relates especially to a guard which is removably mounted on the roller supporting posts of the wringer an appreciable distance above the top or upper roller of the wringer arranged to prevent the hand of the operator from coming into contact with the rollers which would probably prove injurious to the operator.

Other objects will appear hereinafter.

The invention consists in the combinations and arrangements of parts hereinafter described and claimed.

The invention will be best understood by reference to the accompanying drawings forming a part of this specification, and in which, Fig. 1 is a fragmentary side elevational view of a wringer showing a guard, embodying the invention, mounted thereon;

Fig. 2 is a sectional detail view, of the same, taken substantially on line 2—2 of Fig. 1;

Fig. 3 is a top plan view of the guard illustrated in Fig. 1; and

Fig. 4 is a perspective view of one of the guard supports embodied in the invention.

In the drawing, A indicates a wringer of any approved type comprising opposite roller supporting posts 5 and 5' and adjacent rollers 6 and 7 which are operatively connected by gears (not shown) inclosed in a housing 8, said rollers being operable through the medium of an operating handle 9 as shown or the said rollers can be power driven as desired. Most any approved wringer is provided with oppositely arranged feed boards which in this instance are indicated at 9 and fixedly secured to a transverse support 10 by angular brackets 11, as shown. In the construction illustrated in Fig. 2 the posts 5 and 5' of the wringer A are constructed in spaced relation with respect to each other, as at 12, to permit the distance between the rollers to be adjusted according to the desire of the operator. This adjustability of the rollers is provided in most any approved type of wringer and does not embody the invention and the same is not illustrated in the drawings. Traversing the space 12 between each of the roller supports is a supporting member 13 having a lateral bearing member 14 arranged and adapted to support the guard B embodying the invention. The guard B comprises oppositely arranged leaf members 15 and 16 which are hingedly connected together by a longitudinally extending shaft 17 which passes through knuckles 18 formed on the adjacent side edges of each of the leaf members 15 and 16. The opposite ends of the shaft 17 are screw-threaded for the reception of adjustable nuts 19 for adjusting the guard B in the proper position when the opposite ends of the shaft 17 are mounted in the lateral bearings 14 of the supports 13. The adjustable nuts 19 also prevent the shaft from moving longitudinally with respect to the roller 6 when mounted in the bearings 14. As shown in Fig. 2 the adjacent side portions 16' of the leaf members 15 and 16 are bent to correspond with the contour of the roller 6 and supported in spaced relation with respect to the periphery of the said roller. When the guard B is mounted in the position shown by full lines in Fig. 2 the leaf members 15 and 16 rest on the adjacent supports 10 and as will be noted the outer ends 20 of the said leaf members are supported an appreciable distance above the feed boards 9, and the outer side edges of the leaf members are in alinement with the outer side edges of the feed boards 9, as shown. This arrangement is such that when the operator feeds the clothes to the rollers there will be a sufficient space between the outer end portions 20 and the feed boards 9 to permit the clothes to readily pass between the rollers when operable but will prevent the operator's hand from travelling with the clothes so as to bring the hand in contact with the rollers and suffer the detrimental action of the same. If at any time the clothes while passing between the rollers become too bulky so as to prevent the operation of the rollers, the operator can raise each or both of the leaf members 15 and 16 in a position shown by dotted lines in Fig. 2, and lock the same in such position through the medium of angular lock plates 21 which are carried by the posts 5 and 5'. The curved portions of the leaf members 15 and 16 are provided with observation openings 22 so as to permit the operator to observe the rollers when in operation which is necessary so as to determine the manner in which the clothes are passing between the rollers.

By my improved guard the operator's hands are protected from the detrimental action of the rollers and at the same time one is enabled to observe the clothes passing between the rollers. The guard as illustrated and herein set forth can be manufactured at a nominal cost and will prove to be of great commercial value.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. A safety guard for a wringer comprising guard members having curved portions extending in spaced relation with respect to one of the rollers of a wringer and having portions extending outwardly therefrom and provided with openings formed in the curved portions permitting observation of said roller, and means for locking said guard members in a position permitting access to the rollers.

2. A safety guard for a wringer comprising in combination with bearing members carried by the roller supports of a wringer, a supporting member carried by said bearings, guard members carried by said supporting member and having portions projecting outwardly from one of the rollers of the wringer, means carried by said supporting member for adjusting said guard members thereon, and angular shaped members carried by the roller supports for holding the guard members in a position permitting access to the rollers.

3. In a safety guard of the class described, the combination with adjacent rollers of a wringer and oppositely arranged supporting posts for said rollers, of a support carried by each of said posts, there being a bearing formed on each of said supports; a guard member removably mounted in said bearings and supported thereby above said rollers, said guard member comprising oppositely arranged leaf members hingedly connected together; and means carried by each of said posts for holding said leaf members out of operative position.

4. In a safety guard of the class described, the combination with adjacent rollers of a wringer and oppositely arranged supporting posts for said rollers, of a support carried by each of said posts, there being a bearing formed on each of said supports; a shaft supported by said bearings; oppositely arranged leaf members hingedly connected to said shaft, the adjacent portions of said leaf members being curved to correspond with the curvature of the upper half of the adjacent roller and the outer portions of said leaf members extending outwardly from said roller; means for adjusting said leaf members on said shaft; and lock plates for holding said leaf members out of operative position.

In testimony whereof I have signed my name to this specification in the presence of two subscribing witnesses.

HENRY SCHUESSLER.

Witnesses:
 FREDA C. APPLETON,
 JOSHUA R. H. POTTS.